United States Patent [19]

James

[11] Patent Number: 4,779,195

[45] Date of Patent: Oct. 18, 1988

[54] INTERRUPT SYSTEM USING MASKING REGISTER IN PROCESSOR FOR SELECTIVELY ESTABLISHING DEVICE ELIGIBILITY TO INTERRUPT A PARTICULAR PROCESSOR

[75] Inventor: David V. James, Palo Alto, Calif.

[73] Assignee: Hewlett-Packard Company, Palo Alto, Calif.

[21] Appl. No.: 750,580

[22] Filed: Jun. 28, 1985

[51] Int. Cl.[4] .......................................... G06F 13/24
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,905,025 | 9/1975 | David et al. | 364/200 |
| 4,004,283 | 1/1977 | Bennett | 364/200 |
| 4,177,515 | 12/1979 | Jenkins et al. | 364/200 |
| 4,237,535 | 12/1980 | Wiedenman | 364/200 |
| 4,268,904 | 5/1981 | Suzuki | 364/200 |
| 4,271,468 | 6/1981 | Charistensen et al. | 364/200 |
| 4,275,440 | 6/1981 | Adams, Jr. et al. | 364/200 |
| 4,400,773 | 8/1983 | Brown et al. | 364/200 |

Primary Examiner—Raulfe B. Zache
Assistant Examiner—Emily Y. Chan
Attorney, Agent, or Firm—Douglas L. Weller

[57] ABSTRACT

Each processor in a system using the interrupt generation scheme has an external interrupt register (EIR) an input/output EIR (IO_EIR) and an external interrupt mask register (EIM). When an I/O device wants to interrupt a first processor the I/O device writes a predetermined value to the first processor's IO_EIR. When the predetermined value is written into the first processor's IO_EIR, this causes a specified bit in the first processor's EIR to be set (or cleared depending upon system convention) and an interrupt to occur. The specified bit in the EIR indicates to the first processor either the I/O device which caused the interrupt, or a group of I/O devices which includes the I/O device which caused the interrupt. An I/O device can cause a bit in the EIR to be set, but only a processor can clear bits set in its EIR. The EIM is used by the processor to postpone taking action on an interrupt received from an I/O device. The processor takes action on an interrupt when an I/O device causes a bit to be set in the EIR, and a corresponding bit in the processor's EIM is set. If the corresponding bit in the EIM is not set, then the processor delays action on the interrupt until the corresponding bit in the EIM is set.

1 Claim, 2 Drawing Sheets

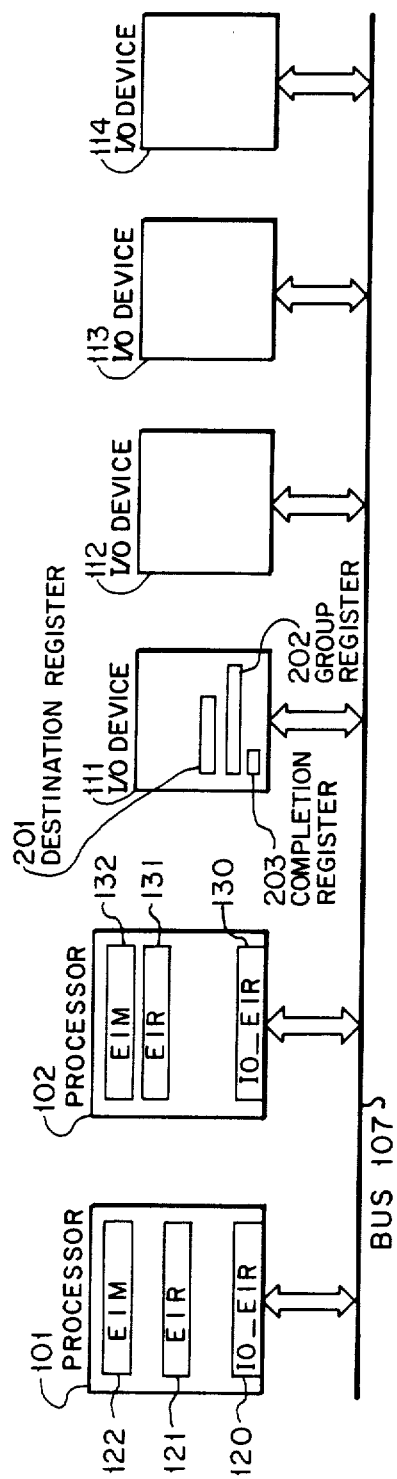
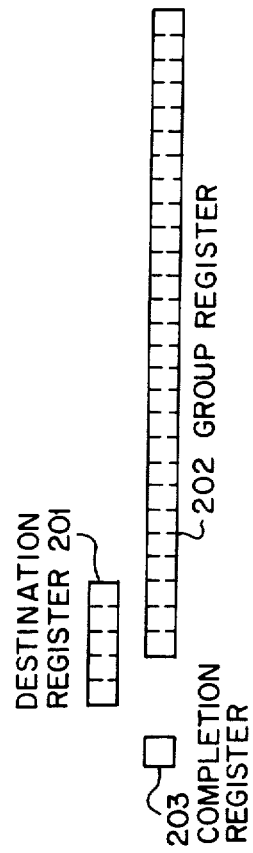
FIG 1
FIG 2

INTERRUPT SYSTEM USING MASKING REGISTER IN PROCESSOR FOR SELECTIVELY ESTABLISHING DEVICE ELIGIBILITY TO INTERRUPT A PARTICULAR PROCESSOR

BACKGROUND OF THE INVENTION

The invention provides a versatile means of generating and handling interrupts to a processor. Typically, in the prior art, interrupt processing has used special hardware to receive and decode interrupts. For instance, an Input/Output (I/O) device might generate an interrupt by assertion of an interrupt vector on a special bus. The interrupt vector might consist of two portions, an interrupt priority and a vector table index. If the interrupt priority exceeds a current priority of the processor, a program counter is loaded with an instruction address obtained from an indexed entry in a vector table.

The above-discussed method of interrupt processing has certain disadvantages. For instance, special bus protocols and hardware are required to implement interrupts. Also, when hardware is vectoring one interrupt, additional lower priority interrupts are not processed. Furthermore, interrupt priorities cannot be easily reassigned. Additionally, a special instruction is required for a processor to generate interrupts.

SUMMARY OF THE INVENTION

In accordance with the preferred embodiment of the present invention, an interrupt generation scheme is presented. Each processor in a system using the scheme has an external interrupt register (EIR) an input/output EIR (IO_EIR) and an external interrupt mask register (EIM).

When an I/0 device wants to interrupt a first processor the I/0 device writes a predetermined value to the first processor's IO_EIR. When the predetermined value is written into the first processor's IO_EIR, this causes a specified bit in the first processor's EIR to be set (or cleared depending upon system convention) and an interrupt to occur. The specified bit in the EIR indicates to the first processor either the I/O device which caused the interrupt, or a group of I/O devices which includes the I/O device which caused the interrupt. An I/O device can cause a bit in the EIR to be set, but only a processor can clear bits set in its EIR. The EIM is used by the processor to postpone taking action on an interrupt received from an I/O device. The processor takes action on an interrupt when an I/O device causes a bit to be set in the EIR, and a corresponding bit in the processor's EIM is set. If the corresponding bit in the EIM is not set, then the processor delays action on the interrupt until the corresponding bit in the EIM is set.

The contents of the EIM may be changed at any time by the processor. The processor uses the EIM to select which devices or groups of devices may interrupt a particular process. If an I/O device sets a bit in a processor's EIR and the corresponding bit in the EIM is not set, the bit in the EIR remains set until the corresponding bit in the EIM is set. When a bit in the EIM is set and a corresponding bit in the EIR is set the processor acts on the interruption indicated by the bit in the EIR being set. The above system of handling interrupts assures that no interrupts are lost, and the system abolishes the need for an I/O device to continually be trying to interrupt a processor. When a processor is interrupted the processor determines which bit or bits in its EIR is set, and based on that executes a particular section of code which handles the interrupt.

When a given bit in a processor's EIR is set, and a corresponding bit in the processor's EIM is set, the processor handles the interrupt by first clearing the given bit. Then the processor polls all active I/O devices within a group of active I/O devices which have been assigned to the given bit. Finally, the processor services the I/O device or devices within the group of I/O devices assigned to the given bit which have generated an interrupt.

BRIEF DESCRIPTION OF THE DRAWINGS

FIG. 1 is a block diagram of a computer system using interrupt generation scheme in accordance with the preferred embodiment of the present invention FIG. 2 shows registers in an I/O device, which are used to generate interrupts to processors in the computer system of FIG. 1.

DESCRIPTION OF THE PREFERRED EMBODIMENT

Figure 3:
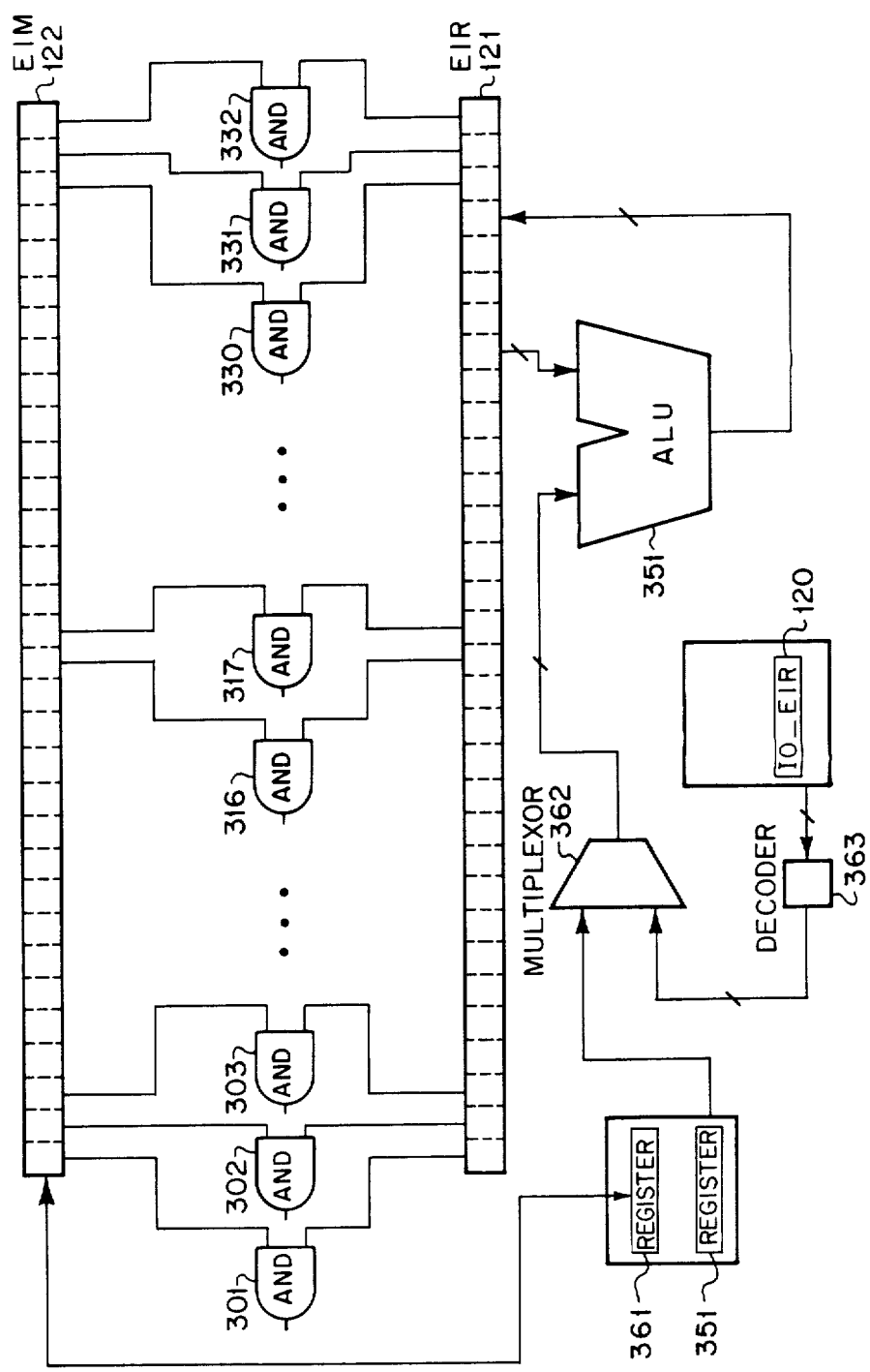
FIG. 3 shows the coupling of an external interrupt register (EIR) and an external interrupt mask register (EIM) of a processor in the computer system of FIG. 1.

In FIG. 1, a processor 101, a processor 102, an input-output (I/O) device 111, an I/O device 112, an I/O device 113 and an I/O device 114 are shown coupled to a bus 107. Processor 101 is shown to have an IO_EIR 120, an EIR 121 and an EIM 122. Processor 102 is shown to have an IO_EIR 130, an EIR 131 and an EIM 132. Bus 107 may be, for instance, a 32-bit bus. In each I/O device 111-114 reside three registers: a destination register, a group register and an completion register. For example, in I/O device 111 resides a destination register 201, a group register 202 and an completion register 203 (also shown in FIG. 2). Destination register 201 is kept data which indicates a bus address of a processor to be interrupted. A particular address may be reserved for "broadcast interrupts" where all processors on the bus are to be interrupted. Group register 202 contains data that when written to a processor's IO_EIR, causes a bit in the processor's EIR to be set which indicates to the processor which I/O device (in this case I/O device 111) interrupted the processor or to which group belongs the I/O device (i.e. I/O device 111) which interrupted the processor. Completion register 203 is set when I/O device 111 has completed a command and sent an interrupt.

When an I/O device desires processor service, it generates a write to that processor's IO_EIR. For instance, suppose I/O device 111 wants to interrupt processor 101. Group register 202 contains data that is to be written to IO_EIR 120. Destination register 201 contains a bus address of processor 101. A data frame is then constructed by I/O device 111. The data frame contains the bus address from register 201, and data within the data frame contains data from group register 202.

Group register 202 contains information indicating which bit in the addressed processor's external interrupt register (EIR) is to be set. For instance, in a 32-bit bus machine, the least significant bits contained in group register 202 might contain the address of the bit in the EIR which is to be set. Once an EIR bit is set it can be reset only by the processor. Subsequent writes to the EIR by the same or other I/O devices are combined with the then current contents of the EIR by a Boolean "OR" function.

FIG. 3 shows EIR 121 and an external interrupt mask register (EIM) 122. In FIG. 3, EIR 121 and EIM 122 are both shown to be 32-bit registers. Each bit in EIR 121 is shown to be logically coupled to a corresponding bit in EIM 122 by a logical "AND" gate. The logical "AND" gates are represented by gates 301, 302, 303, 316, 317, 330, 331 and 332, as shown. Once a bit in EIR 121 is set by an I/O device, an interrupt is generated if the corresponding bit in EIM 122 is set. If the corresponding bit in EIM 122 is not set, no interrupt is generated until the processor sets the corresponding bit. Thus the processor can use EIM 122 to set priority levels and change them by changing the contents of EIM 122.

Bits in EIM 122 can be set or cleared by any software process which is running on processor 101 and which is given write access to EIM 122. For instance the contents of a register 361 may be loaded into EIM 122, or the contents of EIM 122 can be read into register 361.

Bits in EIR 121 may be set or cleared using an arithmetic logic unit (ALU) 351. Bits in EIR 121 may be set by selecting output from IO_EIR 120 through a decoder 363, through a multiplexor 362 to ALU351. ALU 361 performs a Boolean OR operation on contents received from IO_EIR 120 and on the contents of EIR 121. The result is stored in EIR 121.

Selected bits in EIR 121 may be cleared by selecting input from a register 351 through multiplexor 362 to ALU 351. ALU 351 performs a Boolean AND operation on contents received from register 351 and on the contents of EIR 121. The result is stored in EIR 121.

I claim:

1. An apparatus for processing interrupts from a first device to a processor, the apparatus comprising:

first register in the processor;

second register in the processor;

masking means, in the processor and coupled to the first register for setting a first bit in the first register when the processor will receive interrupts from the first device and clearing the first bit when the processor will not receive interrupts from the first device, wherein the processor directs the masking means when to set the first bit and when to clear the first bit;

setting means, coupled to the second register and to the first device, for setting a first bit in the second register when the first device to interrupt the processor, wherein the first device directs the setting means when to set the first bit in the second register;

clearing means, within the processor and coupled to the second register, for clearing the first bit in the second register, wherein the processor directs the clearing means to clear the first bit after the processor has been interrupted, and wherein once the first bit in the second register is set by the setting means, the first bit remains set until cleared by the clearing means;

detecting means, within the processor and coupled to the first register and the second register, for detecting when the first bit in the first register and the first bit in the second register are both set; and, interrupt generation means, within the processor and coupled to the detecting means, for generating an interrupt to the processor when the first bit in the first register and the first bit in the second register are both set.

* * * * *